United States Patent [19]

Desrochers

[11] 4,442,318
[45] Apr. 10, 1984

[54] PORTABLE BI-DIRECTIONAL DATA COMMUNICATION TERMINAL

[76] Inventor: Franklin J. Desrochers, 6230 Elro St., Davison, Mich. 48423

[21] Appl. No.: 409,779

[22] Filed: Aug. 20, 1982

[51] Int. Cl.³ .......................................... H04M 11/00
[52] U.S. Cl. .................................................. 179/2 C
[58] Field of Search ............................. 179/2 C, 2 DP

[56] References Cited

U.S. PATENT DOCUMENTS

| | | | |
|---|---|---|---|
| 3,976,840 | 8/1976 | Cleveland et al. | 179/2 C X |
| 4,068,095 | 1/1978 | Ghormley et al. | 179/2 C X |
| 4,162,373 | 7/1979 | Ingber | 179/2 C |
| 4,268,721 | 5/1981 | Nielson et al. | 179/2 C |

*Primary Examiner*—G. Z. Rubinson
*Assistant Examiner*—W. J. Brady

[57] ABSTRACT

The housing for a hand-held terminal includes a first acoustical coupler having a muffler disposed therein facing the bottom of the housing. A hinged cover plate includes a second acoustical coupler having a muffler member adapted to nest within the other muffler when the cover plate is pivoted to a closed position flush with the bottom of the housing. When the cover member is pivoted to an open position it contacts a shoulder on the housing providing an abutment surface to hold the cover plate in an angular position conforming with the configuratiion of a telephone handset.

4 Claims, 5 Drawing Figures

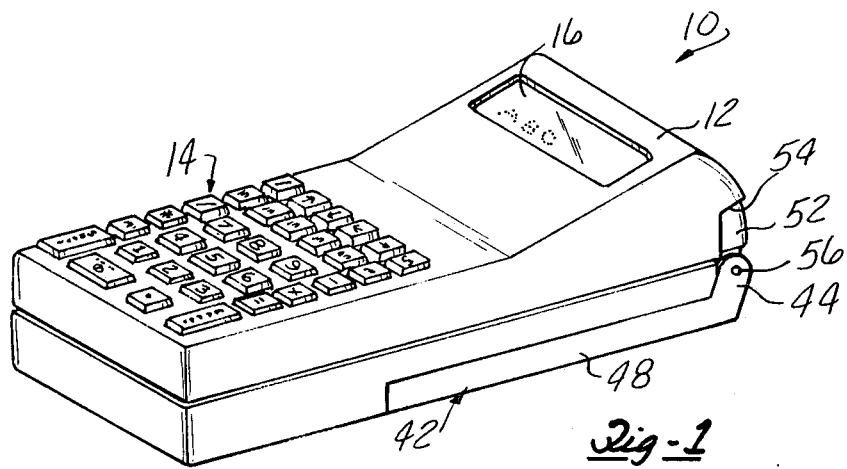
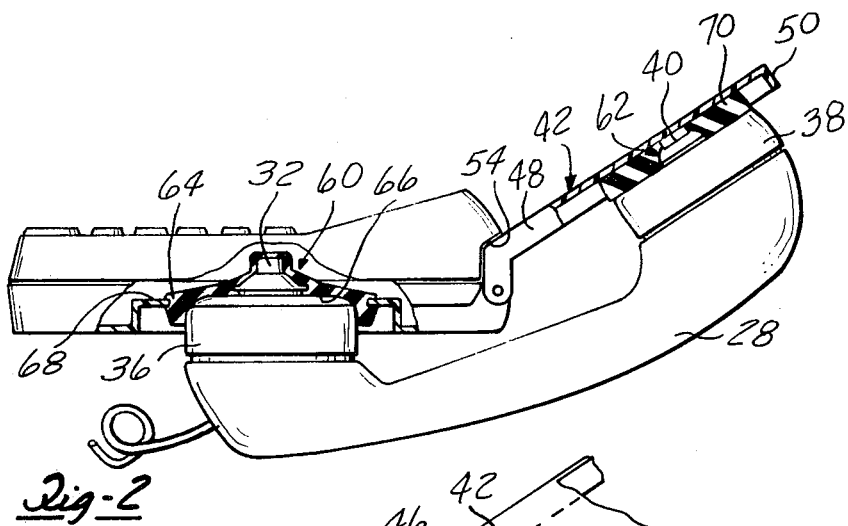
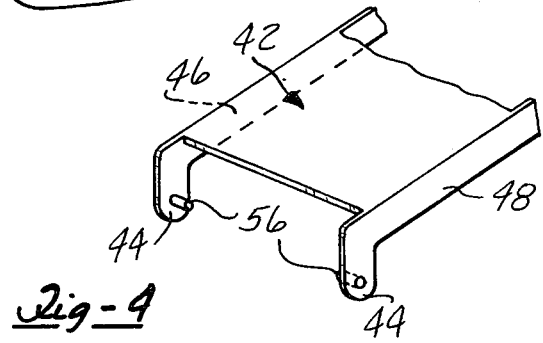

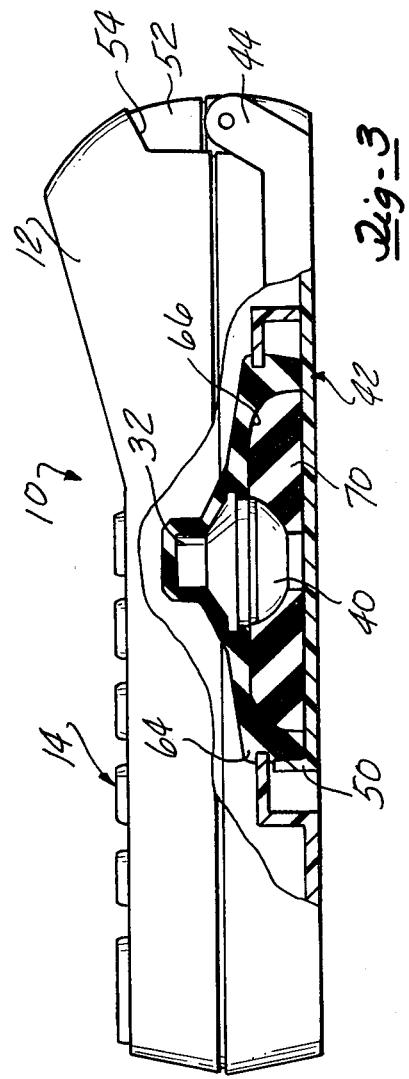
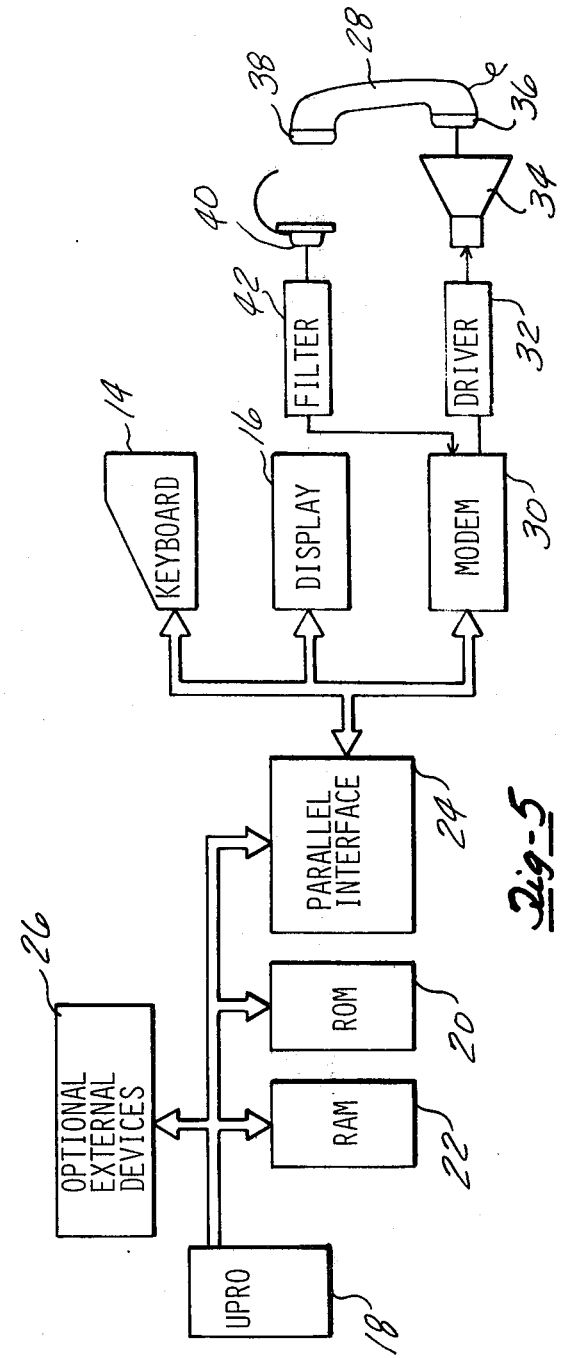

PORTABLE BI-DIRECTIONAL DATA COMMUNICATION TERMINAL

DESCRIPTION

1. Technical Field

This invention relates to data communication devices and, more particularly, to portable terminals having bi-directional data communication capabilities.

2. Background Art

Portable, hand-held terminals are known which are designed for use with telephone handsets for the purpose of sending and receiving information over the transmission lines of a telephone system. Such portable terminals can be used in a wide variety of applications. Examples of such potential uses include: portable credit card verification systems for enabling small retailers to participate in a computer based credit card verification system, a field support terminal for sales personnel enabling orders to be placed directly, terminals for use by field service personnel for recording problems and receiving instructions relating thereto, terminals for transmitting and receiving security quotation and transaction execution requests, and the like.

Common to all such uses of portable terminals of this type, regardless of the application, is the requirement that the device be mechanically stable when physically coupled to the telephone handset so as to render the keyboard and display readily useable by the operator. Efforts to date to design a reliable portable terminal of compact size capable of withstanding an appreciable amount of abuse while at the same time providing the required mechanical stability when coupled to the telephone handset have not been entirely satisfactory.

In U.S. Pat. No. 3,976,840 the acoustical couplers are exposed when not coupled to the handset thus increasing the potential for damage to these relatively sensitive components. The irregular design of the terminal disclosed in this patent makes it awkward to carry in the pocket of the user. Additionally, its mechanical stability when coupled to the telephone handset is suspect.

The portable terminal disclosed in U.S. Pat. No. 4,268,721 is divided into two portions which can be folded. However, the two portions cannot be folded flush with each other thereby making it difficult to carry and likewise may expose the acoustical couplers to sources of potential damage. Additionally, the hinge design used therein does not promote a secure attachment to the telephone handset.

U.S. Pat. No. 4,068,095 appears to provide a more advantageous design but relies upon a rather complex spring biased cradle to insure a good connection with the telephone handset.

SUMMARY OF THE INVENTION

The portable terminal of the present invention provides an efficiently designed construction having a sleek, aesthetically pleasing appearance while at the same time providing good mechanical stability when used with the telephone handset and protection for the acoustical couplers. According to the present invention a first acoustical coupler is mounted within the confines of a generally rectangular housing. The coupler includes an acoustical isolation device or muffler having an opening therein for receiving the receiver portion of a telephone handset. A second acoustical coupler is connected to a cover member hinged to the housing. The muffler member on the cover is adapted to be nested within the other muffler member when the cover is pivoted to a closed position flush with the bottom of the housing. When the cover is pivoted to an open position, the unit is adapted to receive the telephone handset.

Pursuant to a feature of this invention the housing includes a shoulder providing an abutment surface for the cover to hold it in an inclined position corresponding to the configuration of the telephone handset thereby insuring good stability and reliable connections between the terminal and the handset.

BRIEF DESCRIPTION OF THE DRAWINGS

These and other objects and advantages of the present invention will become apparent to one skilled in the art upon reading the following specification and by a reference to the drawings in which:

FIG. 1 is a perspective view of a terminal made in accordance with the preferred embodiment of the present invention;

FIG. 2 is a side view with parts cut away showing the terminal connected to a telephone handset;

FIG. 3 is a side view with parts cut away of the terminal showing the cover therefore in a closed position;

FIG. 4 is a partial perspective view of the cover; and

FIG. 5 is a schematic block diagram of circuitry that may be employed in the terminal of the preferred embodiment.

DESCRIPTION OF THE PREFERRED EMBODIMENT

Referring now to the drawings, especially FIG. 1, terminal 10 of the present invention utilizes a generally rectangular housing 12 made of rigid plastic material or the like. Housing 12 may conveniently be divided into upper and lower sections which snap together to provide a unitary structure. The upper surface of housing 12 includes a keyboard 14 for entering data and control signals into memory in a manner well known in the art. An alphanumeric display 16 is also suitably mounted on the upper surface of housing 12. Interior portions of terminal 10 include electrical circuitry mounted on circuit boards powered by a battery supply (not shown) for accomplishing a wide variety of functions.

FIG. 5 illustrates in block diagram form the type of circuitry that may typically be employed in terminal 10. A microprocessor 18 operating under the control of suitable software instructions stored in ROM member 20 may control the storage of data input from keyboard 14 into a RAM memory 22 via parallel interface circuitry 24. In response to suitable commands, the microprocessor 18 may cause the generation of alphanumeric characters on display 16. Optional external devices 26 may also be connected to terminal 10 in a manner known in the art.

Particularly advantageous is the terminal's capability to bi-directionally communicate with a remote data source connected to telephone transmission lines via telephone handset 28. To transmit data from terminal 10 to the remote data source, microprocessor 18 sends the digital data to a modem 30 which modulates the digital signals, applying them through driver 32 to a speaker transducer 34. The digital signals are thereby converted to acoustical tone bursts which are transmitted over the receiver portion 36 of the handset 28. It should be understood that the data to be transmitted may be derived from a variety of sources such as RAM 28, external devices 26, or directly from keyboard 14.

In the receiving mode the acoustical tone bursts are received over transmitter portion 38 of the handset. A suitable pick-up transducer device 40 receives the acoustical or inductive signals from the transmitter portion 38 of the handset and converts them into electrical signals. These signals are applied to a receiver filter 42 which removes the noise signals and applies the result to the modem 30 which demodulates the carrier and provides the demodulated signals to the parallel interface element 24 where the microprocessor 18 may read the received data, processing it in a variety of manners.

The present invention is primarily directed towards the provision of a uniquely designed housing for the terminal which insures mechanical stability between the telephone handset 28 and the terminal, while protecting sensitive components from damage. FIGS. 1 and 3 illustrate the terminal 10 of the present invention when not connected to telephone handset 28. FIG. 2, on the other hand, illustrates terminal 10 when used with handset 28.

Terminal 10 includes a bottom cover 42 which is pivotally connected at one end of housing 12. As can be seen most clearly in FIG. 4, cover 42 includes a pair of tabs 44 which are pivotally connected to the lower rear sides of terminal 12. In the preferred embodiment cover 42 includes side flanges 46, 48 and a front flange 50.

In the preferred embodiment, the lower rear sides of housing 12 include cut away portions 52 indented from the major outer skins of housing 12 by a thickness approximating the thickness of tabs 44. A particularly advantageous feature of this invention is the provision of shoulders 54 which provide abutment surfaces for the cover when used with handset 28 as shown in FIG. 2. The angle of shoulders 54 with respect to the horizontal major axis of housing 12 is substantially the same as the angle that would be defined by projections of lines running parallel to the flat outer surfaces of the receiver 36 and transmitter 38 portions of the handset 28. The cover 42 which pivots about pivot pins 56 thus is securely held in the proper angular orientation for receiving handset 28.

Special attention should now be drawn to the acoustical couplers 60, 62 for connection with the receiver 36 and transmitter 38 portions respectively, of handset 28. The acoustical coupler 60 is mounted within housing 12 whereas acoustical coupler 62 is mounted on cover 42. Acoustical coupler 60 includes a muffler member 64 made of resilient, acoustical isolation material such as relatively hard foam rubber-like material. Muffler member 64 includes a centrally exposed opening 66 defining a concave recess into which handset receiver portion 36 may be press fit. The muffler member 64 may be conveniently held in place by way of annular bracket 68. The speaker transducer 32 is suitably mounted within muffler member 64. Consequently, it can be seen that this arrangement isolates noise from the outside environment that may otherwise affect the accuracy of the data transmission.

The acoustical coupler 62 on cover 42 similarly includes a muffler member 70. Muffler member 70 takes the form of an annular member whose outer diameter is less than the diameter of the opening 66 in muffler member 64. Preferably, muffler member 70 is of a shape generally corresponding to the configuration of the recess defined by opening 66. As can be seen most clearly in FIG. 3 the shape and spatial relationship between muffler members 70 and 64 enable cover 42 to be folded flush with the bottom of housing 12 when the handset is not in use. In the disclosed embodiment, cover 42 is held in the closed position by way of frictional engagement between the two muffler members 64, 70 as well as that between cover flange 50 and the left outer side of muffler member 64. Of course, other alternative latching arrangements may be employed.

Those skilled in the art can now appreciate the advances over the art that the present invention has made. When not in use with handset 28, the terminal 10 is of a sleek, compact design in which the acoustical couplers are protected from damage. When in use with handset 28, the terminal 10 provides excellent mechanical stability. Note that muffler 70 does not necessarily have to include the usual collar for receiving handset transmitter portion 38. However, because of the provision of the cover abutment surfaces 54, the muffler 70 and handset transmitter 38 will be pressed together sufficiently tight in the shown mounting arrangement so that excessive environmental noise remains isolated from pick-up transducer 40.

Still other advantages of the present invention will become apparent to one skilled in the art upon a study of the specification, drawings and claims.

I claim:

1. A portable terminal having bi-directional data communication capabilities via a telephone handset said terminal comprising:
a generally rectangular housing; a first acoustical coupler having a first muffler member with an opening therein defining a recess adapted to detachably receive a receiver portion of the telephone handset, said first muffler being mounted in said housing with the opening therein facing the bottom of the housing; a cover for the bottom of the housing; a second acoustical coupler having a second muffler member mounted on an inner surface of the cover, said second muffler member being of a configuration adapted to fit within the confines of the opening of the first muffler member; and hinge means for pivotally connecting one end of the cover to the housing, operative to enable flush mounting of the cover on the housing bottom with the second muffler member nested in the opening of the first muffler member in a closed position of the cover, and permitting the first and second muffler members to operably engage the receiver and transmitter portions of the telephone handset when the cover is in an open portion thereby enabling bi-directional data communication with the terminal.

2. The terminal of claim 1 wherein lower sides of the housing include cut away portions having shoulders slanted at an angle with respect to the horizontal axis of the housing generally corresponding to the angle defined by projections of lines running parallel to the receiver and transmitter portions of the telephone handset, said shoulders providing abutment surfaces for the cover when in said open position to securely hold the cover at a conforming angular position with said handset.

3. The terminal of claim 1 wherein said first muffler member is made of resilient material, and wherein said cover plate includes a flange on an opposite end thereof adapted to frictionally engage an outer surface of the first muffler member to secure the cover in the closed position.

4. In a portable terminal having bidirectional data communication capabilities via a telephone handset, said terminal having a generally rectangular housing with a keyboard and display on an upper surface thereof, with first and second acoustical couplers for operably engaging receiver and transmitter portions of the telephone handset, the improvement comprising;

means defining a pair of shoulders on opposite lower end sides of the housing, each of said shoulders being disposed at an angle relative to the horizontal axis of the housing generally corresponding to the angle between projections of lines running parallel to the receiver and transmitter portions of the handset;

a cover for the bottom of the housing including a generally flat plate and a pair of tabs projecting from opposite end sides thereof at an angle with respect to the plate approximating the angle between said shoulders and a vertical axis of the housing, said tabs being pivotally mounted to said lower end sides of the housing beneath said shoulders;

a first acoustical coupler including a first muffler member having an opening therein defining a recess for receiving the receiver portion of the handset, said first muffler member facing the bottom of the housing;

a second acoustical coupler on an inner surface of the plate of the cover, said second acoustical coupler having a second muffler member generally conforming to the recess in the first muffler member;

means for securing said cover in a closed position with the second muffler member nested within the confines of the recess in the first muffler member; and wherein said cover member may be pivotally mounted to an open position with portions of the cover abutting the shoulders to thereby hold the cover securely in a position generally conforming to the angular orientation of the handset.

\* \* \* \* \*